March 5, 1940.  C. SCHMIDT  2,192,528
DEPTH STOP FOR A COUNTERSINKING OR BORING TOOL
Filed Sept. 15, 1937
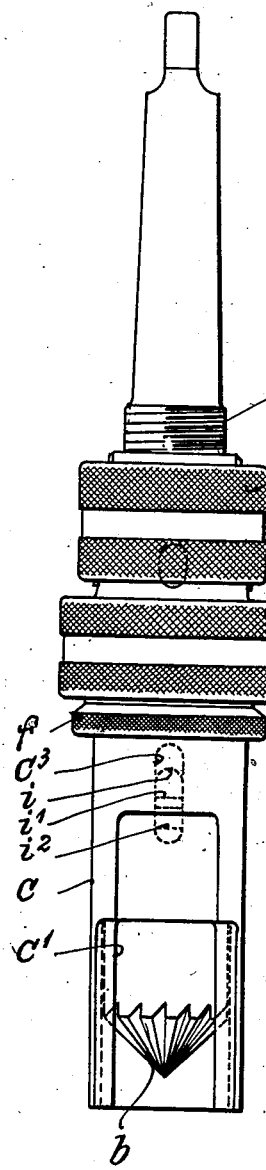
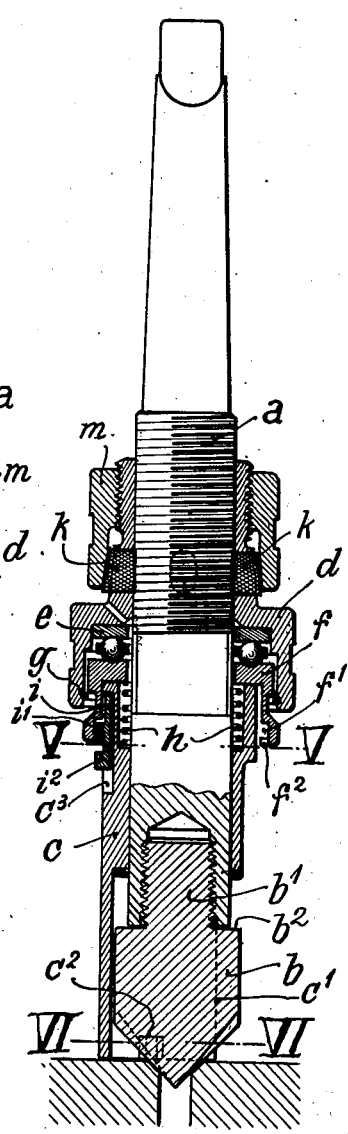
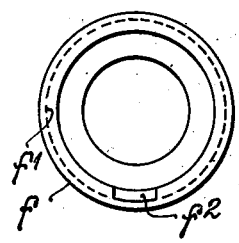
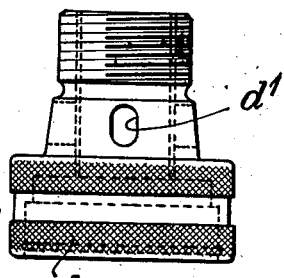
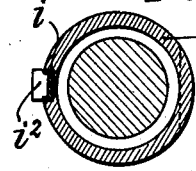
Inventor:
Carl Schmidt
by S. Sokal
Attorney.

Patented Mar. 5, 1940

2,192,528

UNITED STATES PATENT OFFICE 2,192,528

DEPTH STOP FOR A COUNTERSINKING OR BORING TOOL

Carl Schmidt, Hamburg, Germany, assignor to Werner Roterberg, Dusseldorf, Germany Application September 15, 1937, Serial No. 163,931
In Germany May 22, 1936

6 Claims. (Cl. 77—55)

The invention relates to a device for countersinking, boring, milling and similar operations of the kind having a depth stop which is carried by a member which is adjustable longitudinally relatively to the tool and which stop is freely rotatable independently of the adjusting member. According to this invention, the depth stop comprises a sleeve, which is mounted on the driving spindle carrying the tool, in such manner as to be freely movable longitudinally thereon, and which may be, as desired, either fixed with respect to the housing, which is adjustable in its height and is stationary when the appliance is in use, or longitudinally movable with respect thereto so as to form either a fixed or movable depth stop. Stationary depth stop sleeves or depth stop sleeves adjustable in their height are known for this purpose, as are also, on the other hand, longitudinally movably mounted depth stop sleeves, so that by the combination, according to the invention, of the two kinds of depth stop sleeves a novel simplification is obtained, especially as the changing over at will is effected without interchanging the driving spindle or the countersinking or boring appliance. By the aid of a rotatable intermediate depth stop sleeve resting against a ball thrust bearing, easy running, when working with a stationary depth stop sleeve, is obtained, and in addition to this the thrust bearing takes up the pressure in the lower end position when the depth stop sleeve is operating so as to be longitudinally movable, so that the depth stop sleeve on striking the workpiece remains stationary.

The fixed depth stop sleeve is advantageously employed with small countersinks or milling tools and there is then always sufficient space between the depth stop sleeve and the tool for the accumulating borings. On the other hand the longitudinally movable depth stop sleeve is always employed with larger milling tools. When working close to vertical walls a window or a recess provided in the depth stop sleeve renders it possible to utilise the available space to the full extent and for the same purpose, when working with milling tools of large diameter, a flattened surface is provided at the upper part of the depth stop sleeve.

A preferred constructional form of a device according to the invention is illustrated by way of example in the accompanying drawing, in which:

Fig. 1 is an elevation of the device,
Fig. 2 is a longitudinal section thereof,
Figs. 3 and 4 show details,
Fig. 5 is a section taken on line V—V of Fig. 2, and
Fig. 6 is a section taken on line VI—VI of Fig. 2.

Referring to the drawing:

In the shank $a$ of the borer, which shank may be provided with a Morse cone, a countersink $b$, milling tool or other operative tool is rigidly fixed by means of a screwed pin $b^1$ or in other suitable manner, and on the said shank $a$ a sleeve $c$ forming the depth stop is mounted so as to be longitudinally slidable and rotatable. As a support and counterbearing for the said depth stop sleeve $c$, a housing $d$ fixed on the shank $a$ by means of a screw thread is provided, which housing is adapted for the reception of a ball thrust bearing serving as a counterbearing. The base ring $e$ of the said ball bearing is tightly held in a recess of the housing $d$, or the housing $d$ is itself constructed as a bearing cup, and the counterbearing for the balls secured in the usual manner by means of a cage is constituted by a ring $f$, which is mounted so as to be freely rotatable in the housing and which is held in place, for example by means of a spring ring, the said ring $f$ serving as the guide bearing for the depth stop sleeve $c$.

By means of this peculiar interpolation of a guide member (ring $f$) between the ball thrust bearing and the depth stop sleeve $c$, the manipulation of the appliance is simplified, and on the other hand a variety of methods of employment are rendered possible. Between the depth stop sleeve $c$ and the ring $f$ a helical spring $h$ is arranged in a recess, whereby the depth stop sleeve is pushed forward up to the stop formed by the shoulder $b^2$ of the milling tool and covers the latter substantially in its entirety. In order, however, that the said tool should, in this arrangement, be adapted to be introduced rapidly and with certainty into the hole to be worked upon, the depth stop sleeve is provided with a recess $c^1$ and in addition to this it is flattened off above the said recess, whereby lateral access is obtained in order to render it possible to employ the appliance even in the immediate neighbourhood of vertical walls. As is shown in Fig. 1, wherein the recess $c^1$ is located in front, the point of the tool can be observed, and as the depth stop sleeve is mounted so as to be freely rotatable it can also be held in position in order to simplify the observation of the hole which is worked upon. The ball thrust bearing only comes into action when the countersinking operation is completed and the depth stop sleeve c bears with its upper edge surface on the ring f.

A second method of operating is, however, likewise possible, inasmuch as the depth stop sleeve c is provided with a bolt i, which engages by means of a projection $i^1$ with an annular groove $f^1$ of the ring f. The said ring is provided with a recess $f^2$ in order to render the introduction of the bolt possible. With this arrangement the depth stop sleeve c is prevented from moving longitudinally but it can turn freely together with the ring f. It should be noted that the locking by means of the bolt i is ensured by means of the tension spring h.

In this position of the depth stop sleeve c, which is shown in Fig. 2, the depth stop sleeve forms a fixed stop for the tool and only applies itself to the workpiece when the countersinking operation is completed. In order in this case to avoid inaccuracies resulting from waste borings, the lower front surface of the depth stop sleeve c is provided with recesses $c^2$ through which borings are ejected.

In order that when working with the longitudinally movable depth stop sleeve (Fig. 1), the bolt i should not snap into the groove $f^1$ in the end position of the depth stop sleeve, the bolt, which is provided with a handlle $i^2$, is mounted so as to be longitudinally slidable in a recess $c^3$. If, therefore, the bolt takes up the position illustrated in Fig. 1, then it cannot come into contact with the ring f even in the highest position of the said depth stop sleeve.

For the adjustment of the working or countersinking depth, the depth stop sleeve c may consist of several parts screwed one into the other so that it can be made longer or shorter as desired. In the device illustrated by way of example the housing d is, on the other hand, adjustably mounted on the spindle a.

For securing the said housing d, which is adjustable by means of a screw thread on the spindle a, an enclosing nut m, which, through the medium of a conical projection, presses a number of wedges k against the thread of the spindle a, serves. The said wedges or pressing cheeks, which may, for example, consist of a somewhat softer material, are mounted in openings $d^1$ of the housing d and are pressed into the screw threads when the nut m is tightened.

I claim:

1. In a device of the kind specified, the subcombination of: a tool shank; a tool on said shank; a shoulder on said tool; an adjustable housing mounted on the said shank; a ball thrust bearing mounted in said adjustable housing, said bearing comprising a fixed inner ring; an outer rotatable ring and intermediate balls; said outer ring having a depending flange; a sleeve, forming a depth stop, detachably engaging said flange at the lower end thereof, said sleeve having a depending guide portion surrounding said tool shank; a spring interposed between said sleeve and said outer ring adapted normally to retain said guide in engagement with said shoulder on said tool, the arrangement being such that, in use, said sleeve guide engages the workpiece to be treated before commencement of the operation and is gradually moved longitudinally relatively to said tool shank against the action of said spring until the upper edge of said sleeve contacts said outer supporting ring whereon the tool is prevented from further penetration into said workpiece.

2. In a device of the kind specified, the subcombination of: a tool shank; a tool on said shank; a shoulder on said tool; an adjustable housing mounted on the said shank; a ball thrust bearing mounted in said adjustable housing, said bearing comprising a fixed inner ring; an outer rotatable ring and intermeidate balls; said outer ring having a depending flange; a sleeve, forming a depth stop, detachably engaging said flange at the lower end thereof, said sleeve having a depending guide portion surrounding said tool shank; a spring interposed between said sleeve and said outer ring adapted normally to retain said guide in engagement with said shoulder on said tool, whereby said sleeve can act as a longitudinally movable depth stop constantly engaging the workpiece; and means for locking said sleeve against relative longitudinal movement relative to said tool shank for the purpose of enabling said sleeve to act as a fixed depth stop engageable with the workpiece only at the end of the drilling or boring operation.

3. In a device of the kind specified, the subcombination of: a tool shank; a tool on said shank; a shoulder on said tool; an adjustable housing mounted on the said shank; a ball thrust bearing mounted in said adjustable housing, said bearing comprising a fixed inner ring; an outer rotatable ring and intermediate balls; said outer ring having a depending flange; a sleeve, forming a depth stop, detachably engaging said flange at the lower end thereof, said sleeve having a depending guide portion surrounding said tool shank; a spring interposed between said sleeve and said outer ring adapted normally to retain said guide in engagement with said shoulder on said tool, whereby said sleeve can act as a longitudinally movable depth stop constantly engaging the workpiece; and a detachable bolt cooperating with said sleeve and said outer ring whereby said sleeve may be locked against relative longitudinal movement so as to act as a fixed depth stop engageable with the workpiece only at the end of the drilling or boring operation.

4. In a device of the kind specified, the subcombination of: a threaded tool shank; a housing screwed to said shank so as to be adjustable longitudinally thereof, and said housing having an internal recess; a ball thrust bearing mounted in said housing; a depending flange carried by said bearing; said flange having an annular groove formed on the inner face thereof and an inwardly directed rim; a longitudinally slidable sleeve normally detachably suspended from said rim, said sleeve surrounding said tool shank and having a depending elongated guide portion forming a depth stop and having a slot therein adjacent the upper end, and said sleeve having a sliding fit on said tool shank so as to be movable relatively to said housing, longitudinally of the tool shank, and a hook bolt for insertion in said slot in said sleeve and engagement with said groove in said flange to lock said sleeve against relative movement for the purpose specified.

5. In a device of the kind specified, the subcombination of: a threaded tool shank; a housing screwed to said shank so as to be adjustable longitudinally thereof; a longitudinally slidable and freely rotatable sleeve carried by said housing, said sleeve surrounding said tool shank and having an integral elongated depending guide portion forming a depth stop and said sleeve having a sliding fit on said tool shank so as to be slidable relative to said housing longitudinally of said shank; and means for locking said sleeve against relative sliding movement for the purpose specified.

6. In a device of the kind specified, the subcombination of: a threaded tool shank; a housing screwed to said shank so as to be adjustable longitudinally thereof; a longitudinally slidable and freely rotatable sleeve carried by said housing, said sleeve surrounding said tool shank and having an integral elongated depending guide portion forming a depth stop and said sleeve having a sliding fit on said tool shank so as to be slidable relative to said housing longitudinally of said shank; and a detachable bolt for co-operation with said sleeve to lock said sleeve against relatve sliding movement for the purpose specified.

CARL SCHMIDT.